United States Patent
Deshmukh et al.

(10) Patent No.: US 11,250,719 B2
(45) Date of Patent: Feb. 15, 2022

(54) GENERATING AND RATING USER ASSESSMENTS

(71) Applicant: INTERNATIONAL BUSINESS MACHINES CORPORATION, Armonk, NY (US)

(72) Inventors: Abhijit Deshmukh, Pune (IN); Saraswathi Sailaja Perumalla, Visakhapatnam (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 16/674,022

(22) Filed: Nov. 5, 2019

(65) Prior Publication Data

US 2021/0134174 A1 May 6, 2021

(51) Int. Cl.
*G09B 7/04* (2006.01)
*G09B 5/12* (2006.01)

(52) U.S. Cl.
CPC .............. *G09B 7/04* (2013.01); *G09B 5/12* (2013.01)

(58) Field of Classification Search
None
See application file for complete search history.

(56) References Cited

U.S. PATENT DOCUMENTS

| | | | |
|---|---|---|---|
| 6,315,572 B1* | 11/2001 | Owens | G09B 7/00 434/118 |
| 2002/0042041 A1* | 4/2002 | Owens | G09B 7/04 434/322 |
| 2012/0208166 A1 | 8/2012 | Ernst | |
| 2015/0125845 A1* | 5/2015 | Cho | G09B 7/02 434/353 |
| 2016/0048772 A1* | 2/2016 | Bruno | G06N 20/00 706/11 |
| 2017/0243500 A1 | 8/2017 | Kompella | |
| 2020/0251006 A1* | 8/2020 | Sharma | G09B 7/00 |
| 2021/0076106 A1* | 3/2021 | Marten | G09B 7/08 |

FOREIGN PATENT DOCUMENTS

CN    108682443 A    10/2018

OTHER PUBLICATIONS

Mell et al., "The NIST Definition of Cloud Computing", National Institute of Standards and Technology, Special Publication 800-145, Sep. 2011, pp. 1-7.

* cited by examiner

*Primary Examiner* — Justin S Lee
(74) *Attorney, Agent, or Firm* — Michael O'Keefe

(57) ABSTRACT

A method, a computer program product, and a computer system for generating and rating assessments is disclosed. Exemplary embodiments include gathering data relating to one or more specialized subject areas and generating a knowledge base based on extracting one or more concepts from the data. Exemplary embodiments further include generating one or more questions and one or more corresponding answer keys relating to the one or more concepts, as well as generating an assessment related to the one or more concepts based on the one or more questions and one or more answer keys.

20 Claims, 5 Drawing Sheets

GENERATING AND RATING USER ASSESSMENTS

BACKGROUND

The exemplary embodiments relate generally to user assessments, and more particularly to dynamically and adaptively generating and rating user assessments.

Static user assessment systems have the disadvantage of being out-dated for subject areas like science, technology, artificial intelligence, molecular biology, bio-informatics, current political events, etc., where the rate of change of information and required human understanding are both very high.

SUMMARY

Exemplary embodiments include gathering data relating to one or more specialized subject areas and generating a knowledge base based on extracting one or more concepts from the data. Exemplary embodiments further include generating one or more questions and one or more corresponding answer keys relating to the one or more concepts, as well as generating an assessment related to the one or more concepts based on the one or more questions and one or more answer keys.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
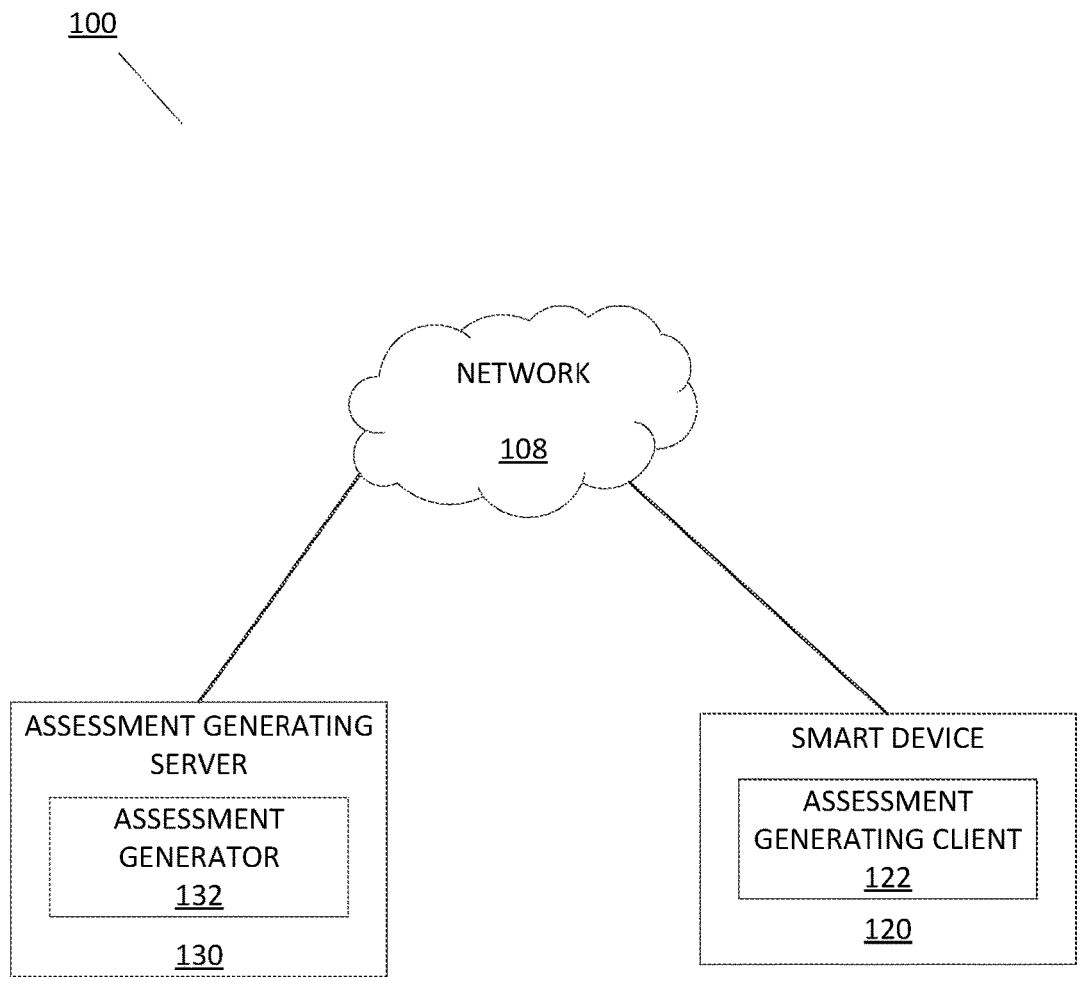
FIG. 1 depicts an exemplary schematic diagram of an assessment generating system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Static user assessment systems have the disadvantage of being out-dated for subject areas like science, technology, artificial intelligence, molecular biology, bio-informatics, current political events, etc., where the rate of change of information and required human understanding are both very high. Such user assessment systems have questions that are created manually by subject matter experts and there tends to be a lead time of days to create assessments. Moreover, the assessments of candidates are not accurate because the static assessments do not include questions and content based on the most recent information.

Accordingly, there is a need for a system to continuously compile knowledge and generate up-to-date user assessments. Such user assessments may be implemented to, for example, recognise prior learning, certify current competencies/licenses, identify training needs, track training/qualification progress, determine language/literacy/numeracy needs, recognise training gaps, measure work performance, classify employees, support career progression, meet organisational requirements for work, operate equipment, etc.

The motivation for exemplary embodiments disclosed herein is to remove the disadvantage of static and out-dated assessments by having a cognitive system automatically crawl, read, and parse large volumes of data on a given subject; then identify concepts related to the subject and create user assessments (questions and keys) targeted to various levels of candidate (or test taker) expertise. For example, for the subject computer networking, exemplary embodiments create assessments for a high-school student, a graduate, a working professional, or a subject matter expert.

Exemplary embodiments disclose a means for dynamically and adaptively generating and rating assessments. Highlights of the exemplary embodiments include increased assessment accuracy, increased assessment relevance, increased assessment effectiveness, and increased assessment efficiency. Exemplary embodiments improve on existing solutions by adaptively and dynamically generating new assessments, thereby producing more accurate and more up-to-date assessments, as will be described in greater detail herein.

FIG. 1 depicts the assessment generating system 100, in accordance with exemplary embodiments. According to the exemplary embodiments, the assessment generating system 100 may include a smart device 120 and an assessment generating server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. For example, in embodiments, the assessment generator 132 and necessary components may be entirely stored on the smart device 110 for use locally without the need to connect to the network 108. The operations of the assessment generating system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 gHz and 5 gHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the smart device 120 includes an assessment generating client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The assessment generating client 122 may act as a client in a client-server relationship, and may be a software and/or hardware application capable of communicating with and providing a user interface for a user to interact with a server and other computing devices via the network 108. Moreover, in the example embodiment, the assessment generating client 122 may be capable of transferring data from the smart device 120 to and from other devices via the network 108. In embodiments, the assessment generating client 122 may utilize various wired and wireless connection protocols for data transmission and exchange, including Bluetooth, 2.4 gHz and 5 gHz internet, near-field communication, Z-Wave, Zigbee, etc. The assessment generating client 122 is described in greater detail with respect to FIG. 2-5.

In the exemplary embodiments, the assessment generating server 130 may include an assessment generator 132, and may act as a server in a client-server relationship with the assessment generating client 122. The assessment generating server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the assessment generation server 130 is shown as a single device, in other embodiments, the assessment generation server 130 may be comprised of a cluster or plurality of computing devices, working together or working independently. The assessment generation server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the assessment generator 132 may be a software and/or hardware program that may be capable of gathering data and extracting concepts from the gathered data to generate a knowledge base. In addition, the assessment generator 132 may be capable of generating questions and answers relating to the concepts of the knowledge base, and further determining a complexity of and mapping the questions to a concept expertise level. The assessment generator 132 may be further capable of generating an assessment, assessing a candidate, and adjusting the assessment. The assessment generator 132 is described in greater detail with reference to FIG. 2.

Figure 2:
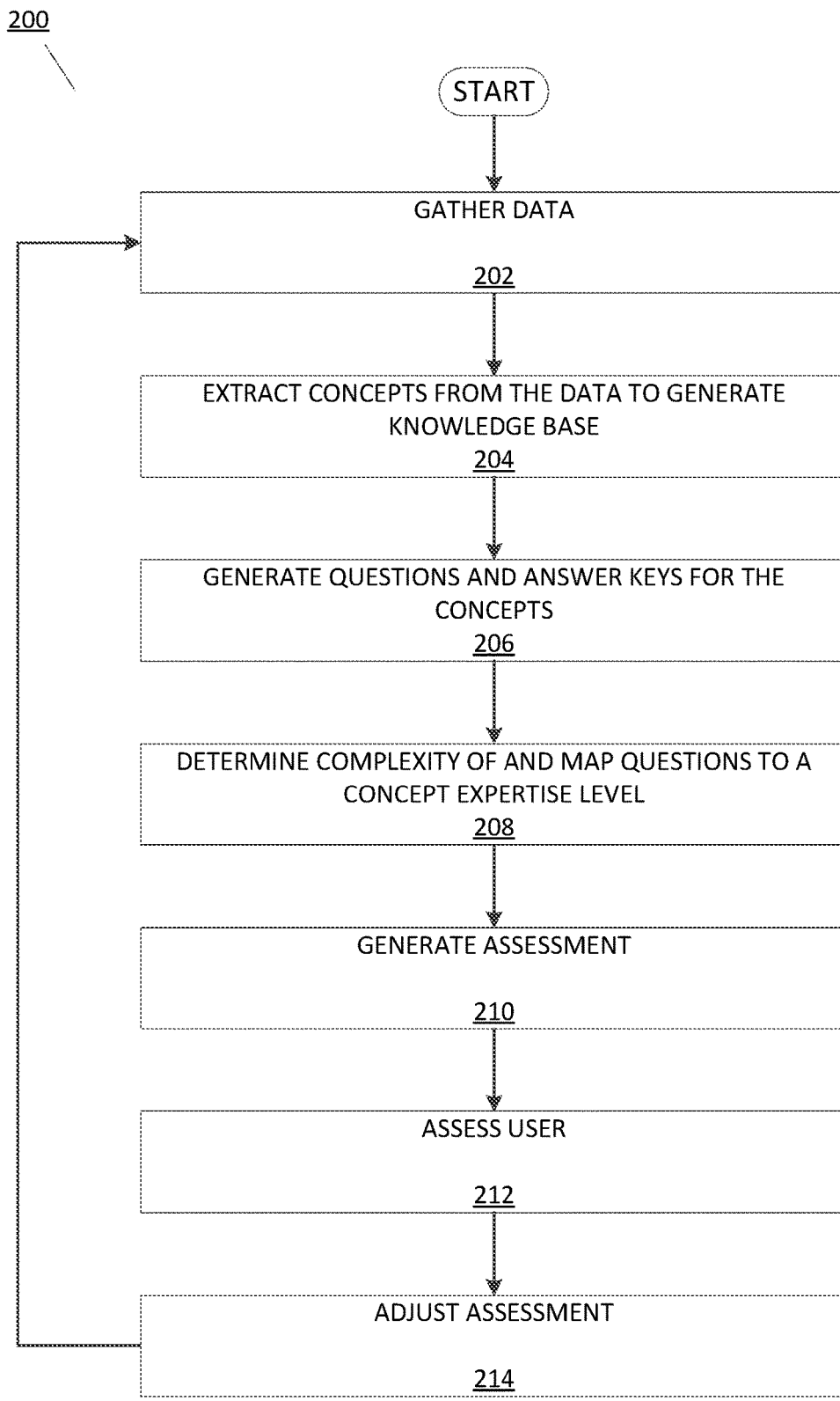
FIG. 2 depicts an exemplary flowchart 200 illustrating the operations of an assessment generator 132 of the assessment generating system 100 in generating user assessments, in accordance with the exemplary embodiments.

FIG. 2 depicts an exemplary flowchart 200 illustrating the operations of an assessment generator 132 of the assessment generating system 100 in generating user assessments, in accordance with the exemplary embodiments.

The assessment generator 132 may gather data (step 202). In embodiments, the assessment generator 132 may gather data by crawling various multilingual sources relating to one or more specialized subject areas, such as management, computer science, microbiology, engineering, arts, humanities, environmental sciences, history, geography, etc. The assessment generator 132 may crawl the data sources using techniques such as selective crawling, in which data may be gathered based on one or more criteria and ranked with a relevance score based on a relevance to the one or more criteria. The assessment generator 132 may rank the data sources based on metrics such as depth (i.e., length of the path from the data source to the data, a total number of levels retrieved from the data source, etc.), popularity, number of backlinks, etc. In addition to the implementing selective crawling, the assessment generator 132 may further crawl the data using techniques such as focused crawling (i.e., topic crawling), in which only data sources within a certain topic are crawled. Similarly, the assessment generator 132 may implement incremental crawling, in which prioritized and previously visited data sources are periodically refreshed. Moreover, the assessment generator 132 may implement distributed crawling, parallel crawling, web dynamics, etc. In general, the assessment generator 132 may utilize any suitable crawling and ranking system for gathering data, and may consider factors such as scalability, transparency, reliability, anti-crawler mechanisms data delivery, support, data quality, etc. The assessment generator 132 may gather the data from input sources such as websites, scientific journals, research papers, textbooks, blogs, notes, wikis, documents, news sources, videos, images, audio, recordings of lectures, etc. Moreover, the assessment generator 132 may be configured to aggregate, fragment, and re-frame the gathered data conceptually using data mining and deep machine learning techniques on the structured and unstructured data.

To further illustrate the operations of the assessment generator 132, reference is now made to an illustrative example in which the assessment generator 132 gathers information from one or more text books, one or more websites, one or more scientific journals, one or more wikis, one or more lectures, and one or more news sources.

The assessment generator 132 may extract concepts from the gathered data in order to generate a knowledge base (step 204). In embodiments, the assessment generator 132 may identify concepts within the data by first processing the data, which may include parsing, indexing, cataloguing, and classifying the data using neural networks, deep learning techniques, natural language processing and understanding, natural language classification, automated translations, transcription, and other algorithms. The assessment generator 132 may then classify and tag concepts, facts, ideas, terms, events, subjects, etc., collectively referred to as "concepts" herein, within the processed data using algorithms and machine learning techniques. In embodiments, the assessment generator 132 may classify the concepts found within the data using techniques such as topic modelling, Naïve Bayes, Gaussian Naïve Bayes, multinomial Naïve Bayes, support-vector machine (SVM), etc. Moreover, the assessment generator 132 may rank the classifications using techniques such as named entity extraction, natural language processing, advanced natural language processing, etc. The assessment generator 132 may further implement a concept enrichment process in which the assessment generator 132 may merge, associate, aggregate, index, and rank the concepts in a network and hierarchical data store, herein known as a "knowledge base". In embodiments, data models stored in the knowledge base may be curated, enhanced, corrected, catalogued, etc., using supervised (e.g., human intervention) and/or unsupervised (e.g., machine learning) validation methods that may improve, correct, or validate the knowledge base. Importantly, the assessment generator 132 may be further configured to periodically update the knowledge base based on crawling both known and new data sources, thereby maintaining most up to date concept data. In such embodiments, data within the knowledge base may be modified, removed, added, etc. based on the new data, and deciding between conflicting data may be determined based on data source, data source confidence, data source reliability, number of data sources (consensus), etc. For example, data within the knowledge base may only be modified if a majority of data sources support the modification. Alternatively, or in addition, the assessment generator 132 may modify data within the knowledge base based on a single source if the single source is reliable enough, etc.

In furthering the previously introduced example for illustration purposes, the assessment generator 132 may identify the concept of mathematics from the gathered data.

The assessment generator 132 may generate questions and answers keys for the concepts within the knowledge base (step 206). In embodiments, the assessment generator 132 may generate questions relating to concepts identified within the knowledge base using the gathered, processed, and enriched data by first parsing the data and then forming questions based on the parsed data. Techniques for parsing the data may include using a phase structure grammar parser, semantic role label parser, a dependency parser, etc., while techniques for forming questions include template matching, transformational rules, tree manipulation tools, syntactic tools, semantic tools, etc. In addition, the assessment generator 132 may further generate answer keys to the generated questions, or keys, in a similar manner, and may further validate and rank the generated keys for accuracy based on synthesizing data points and other concepts available in the knowledge base. In embodiments, the assessment generator 132 may validate and rank the gather data using techniques such as text summarization. Text summarization is the process of generating a concise and meaningful summary of text from multiple text resources, such as the data sources identified above. The assessment generator 132 may summarize text in an extractive manner, in which the summary comprises parts of the data such as phrases and sentences, or an abstractive manner, in which advanced NLP techniques are used to generate a custom summary. Moreover, the assessment generator 132 may rank the generated questions based on a similarity score that identifies commonalities between the data sources. In embodiments, the assessment generator 132 may compute the similarity score by generating vector representations of the sentences within the data sources and storing similarities between the sentence vectors in a similarity matrix. The assessment generator 132 may then convert the similarity matrix into a graph having sentences as vertices and similarity scores as edges for sentence rank calculation, the top-ranked sentences then form the one or more questions. In embodiments, the assessment generator 132 may generate answer keys to the generated questions using a similar technique.

Continuing the illustrative example earlier introduced, the assessment generator 132 generates questions involving addition, subtraction, multiplication, division, and square roots relating to the concept mathematics, as well as respective answer keys.

The assessment generator 132 may determine a complexity of and map the questions to a concept expertise level (step 208). In embodiments, the assessment generator 132 may determine a complexity of a question in order to associate the question with a particular concept expertise level, and may do so using various techniques and based on various factors. For example, the assessment generator 132 may determine a complexity based on qualitative dimensions of text complexity, such as meaning/purpose, structure, language conventionality and clarity, knowledge demand, etc. In addition, the assessment generator 132 may determine a complexity based on quantitative dimensions of text complexity, such world length and frequency, sentence length, text cohesion, etc. Moreover, the assessment generator 132 may determine a complexity based on reader and task considerations, including motivation, knowledge, experience, etc. Concept expertise levels may vary based on concept, however may commonly include beginner levels such as novice, apprentice, basic, foundational, essential, etc., intermediate levels such as advanced beginner, competent, journeyman, etc., as well as advanced levels such as proficient, expert, master, professional, etc. Moreover, the assessment generator 132 may map concept expertise levels based on other factors with regard to a particular concept, such as recency, importance, relevancy, complexity, knowledge demand, familiarity of topic, popularity, etc.

With reference to the illustrative example introduced above, the assessment generator 132 associates the questions relating to addition and subtraction with the concept expertise level of beginner, the questions relating to multiplication and division with the concept expertise level of advanced beginner, and the questions relating to square roots with the concept expertise level of intermediate.

The assessment generator 132 may generate an assessment (step 210). In embodiments, the assessment generator 132 may generate an assessment for any of the various concept expertise levels relating to the specialized subject areas, and may include one or more of the generated questions and one or more corresponding answer keys relating to a particular concept and concept expertise level. In embodiments, one or more assessments may be generated and may be generated once, at periodic intervals, in response to new gathered data, in response to a user request to take an assessment, etc.

In furthering the example introduced above, the assessment generator 132 may generate an assessment for beginner level users that includes addition and subtraction questions, an assessment for advanced beginner level users that includes multiplication and division questions, and an assessment for intermediate level users that includes square root questions.

The assessment generator 132 may assess a user (step 212). In embodiments, the assessment generator 132 may provide the generated assessment to a user via the assessment generating client 122 and the network 108. Moreover, the assessment generator 132 may be configured to receive or determine an expertise level of the user and provide an assessment matching the determined expertise level of the user. The questions of the assessment may be in the form of yes/no, true/false, multiple choice, open ended, etc., and the assessment generator 132 may provide the user a means for answering the questions that may comprise a radio button, toggle switch, drop-down menu, check-box, etc. In embodiments, and based on factors such as the determined complexity of the question, context/requirement of the assessment, concept, user preferences, etc., the assessment generator 132 may be configured to provide the user a text box to input answers to open-ended assessment questions. The assessment generator 132 may then assess the performance of a user based on comparing one or more received answers with the one or more generated and ranked answer keys to the questions. In embodiments, comparing the candidate answers to the keys may be performed by simple comparison, such as comparing multiple choice selections to an answer key, or may require machine learning techniques, such as comparing an open ended candidate answer to a key using natural language processing techniques. In embodiments, the assessment generator 132 may forward candidate answers to an administrator or proctor for assessment and receive the results. After assessing the user, the assessment generator 132 may provide an assessment score, or grade, indicative of a capability of the user as it relates to a particular concept and concept expertise level.

With continued reference to the example above, and based on providing an assessment to a beginner level user, the assessment generator 132 receives answers to questions relating to addition and subtraction from the user, then assesses the user for an assessment score of 92/100.

The assessment generator 132 may adjust the assessment (step 214). In embodiments, the assessment generator 132 may adjust the assessment to vary weights or eliminate errors based on various factors, such as a supervisory validation of the assessment score via human intervention or machine learning techniques, human intervention by proctors or subject matter experts, etc.

Concluding the previously introduced example, the assessment generated 132 receives supervisory validation indicating that the key to a question is incorrect, and receives the correct key via human intervention.

Figure 3:
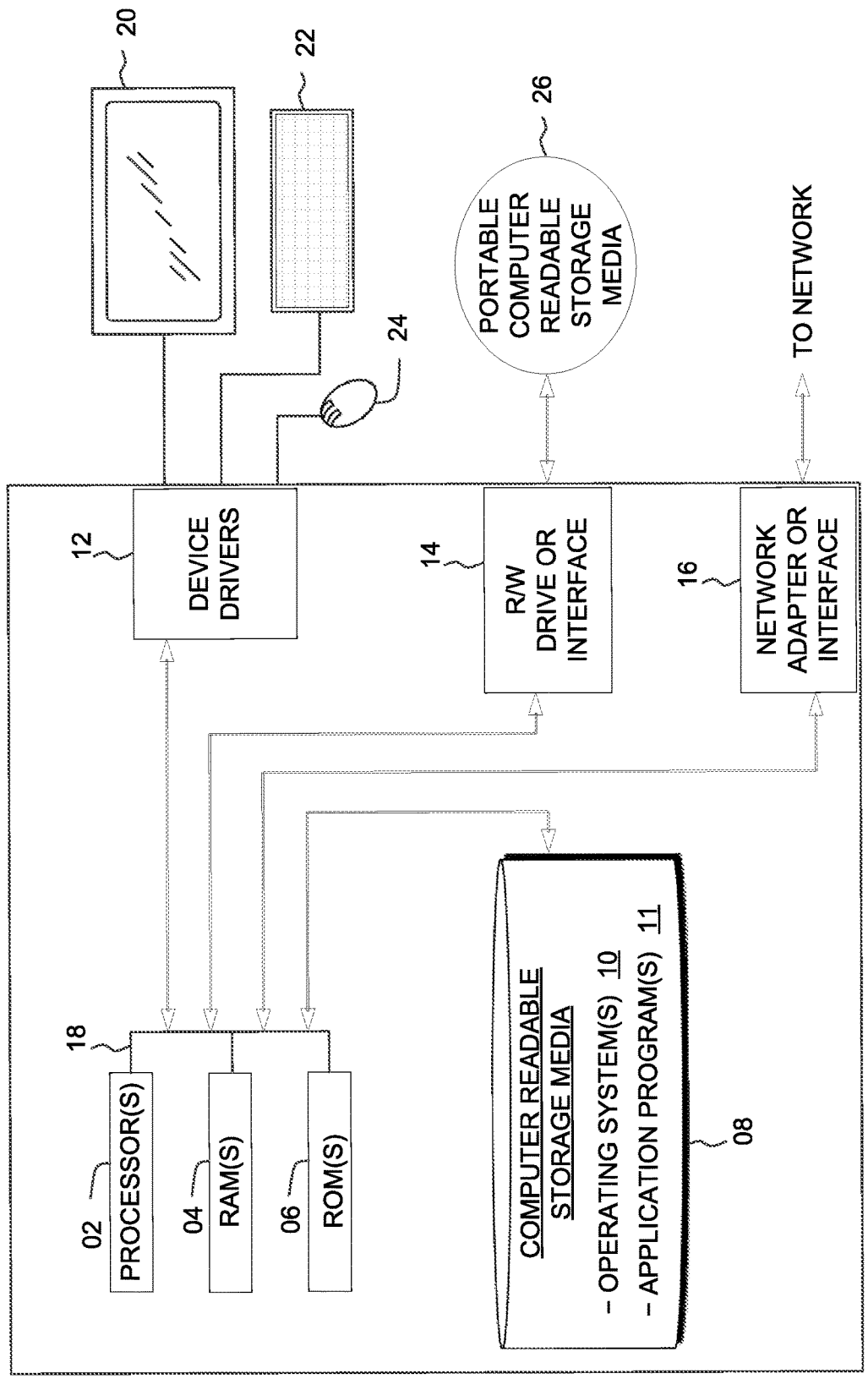
FIG. 3 depicts an exemplary block diagram depicting the hardware components of the assessment generating system 100 of FIG. 1, in accordance with the exemplary embodiments.

FIG. 3 depicts a block diagram of devices within the assessment generating system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
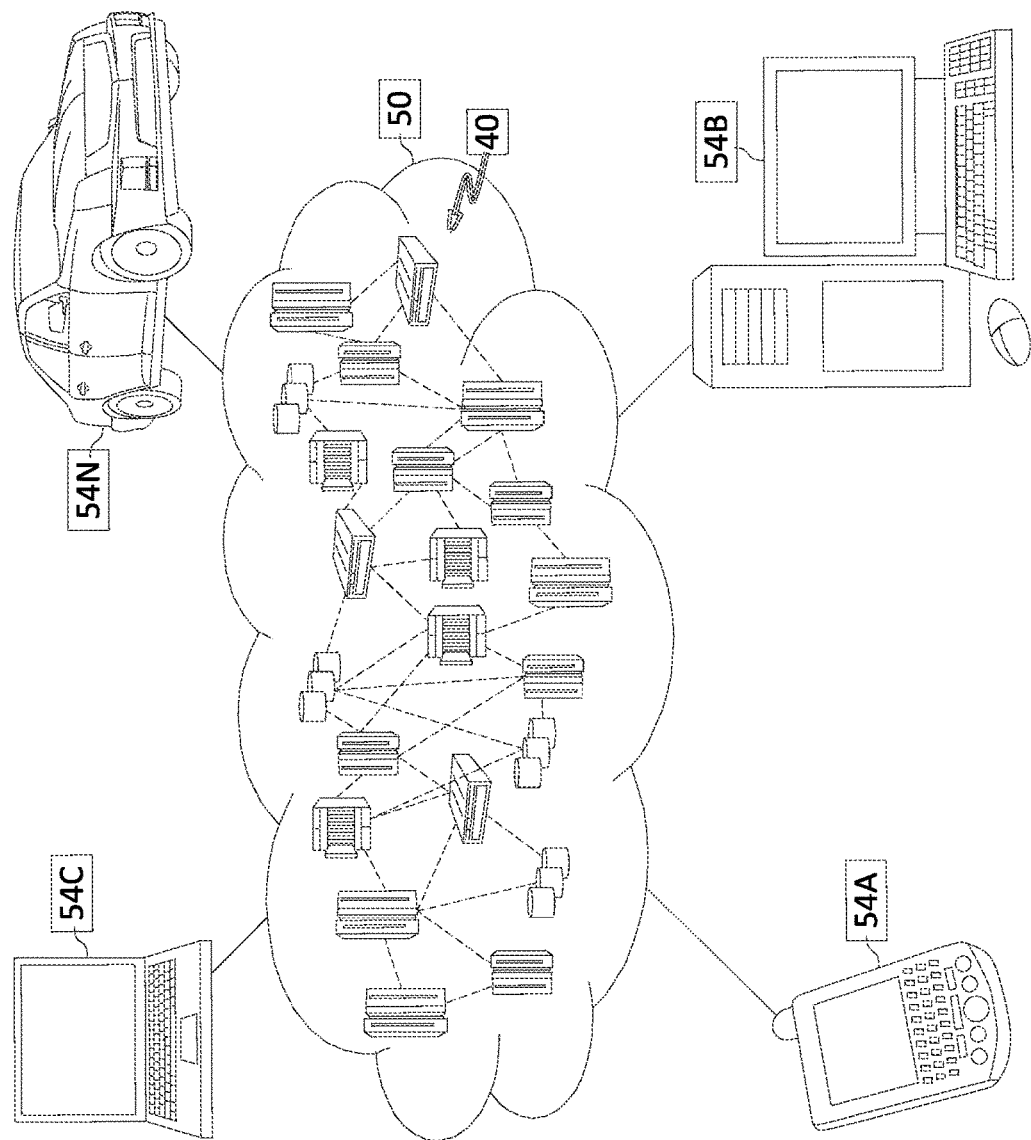
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 5:
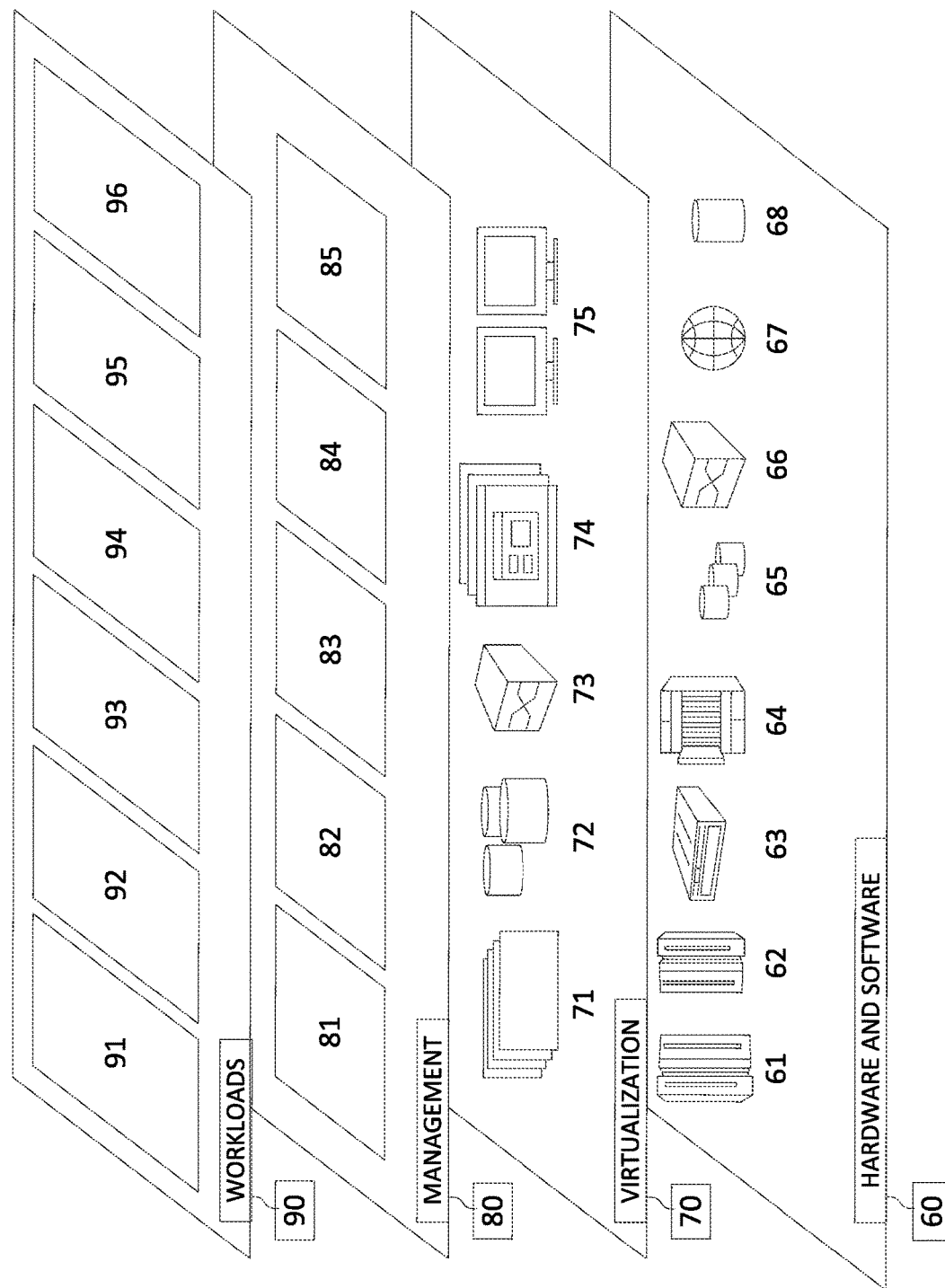
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assessment processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating and rating assessments, the method comprising:
gathering data relating to one or more specialized subject areas;
generating a knowledge base based on extracting one or more concepts from the data;
generating one or more questions and one or more corresponding answer keys relating to the one or more concepts, wherein data used to generate the one or more questions and the one or more corresponding answer keys is parsed from the generated knowledge base using a phase structure grammar parser, and wherein the one or more questions are formed using template matching; and
generating an assessment related to the one or more concepts based on the one or more questions and the one or more corresponding answer keys.

2. The method of claim 1, further comprising:
determining a complexity of the one or more questions;
associating the one or more questions with a concept expertise level based on the determined complexity;
and wherein generating an assessment related to the one or more concepts is further based on the concept expertise level associated with the one or more questions.

3. The method of claim 2, further comprising:
determining an expertise of a user; and
providing the generated assessment to the user based on the expertise of the user and the concept expertise level of the generated assessment.

4. The method of claim 3, further comprising:
receiving one or more answers to the one or more questions from the user; and
assessing the user based on comparing the one or more received answers to the one or more corresponding answer keys.

5. The method of claim 4, further comprising:
adjusting the assessment based on feedback.

6. The method of claim 5, wherein the feedback is generated via supervisory validation.

7. The method of claim 1, wherein the knowledge base is periodically updated.

8. A computer program product for generating and rating assessments, the computer program product comprising:
one or more non-transitory computer-readable storage media and program instructions stored on the one or more non-transitory computer-readable storage media capable of performing a method, the method comprising:
gathering data relating to one or more specialized subject areas;
generating a knowledge base based on extracting one or more concepts from the data;
generating one or more questions and one or more corresponding answer keys relating to the one or more concepts, wherein data used to generate the one or more questions and the one or more corresponding answer keys is parsed from the generated knowledge base using a phase structure grammar parser, and wherein the one or more questions are formed using template matching; and
generating an assessment related to the one or more concepts based on the one or more questions and the one or more corresponding answer keys.

9. The computer program product of claim 8, further comprising:
determining a complexity of the one or more questions;
associating the one or more questions with a concept expertise level based on the determined complexity;
and wherein generating an assessment related to the one or more concepts is further based on the concept expertise level associated with the one or more questions.

10. The computer program product of claim 9, further comprising:
determining an expertise of a user; and
providing the generated assessment to the user based on the expertise of the user and the concept expertise level of the generated assessment.

11. The computer program product of claim 10, further comprising:
receiving one or more answers to the one or more questions from the user; and assessing the user based on comparing the one or more received answers to the one or more corresponding answer keys.

12. The computer program product of claim 11, further comprising:
adjusting the assessment based on feedback.

13. The computer program product of claim 12, wherein the feedback is generated via supervisory validation.

14. The computer program product of claim 8, wherein the knowledge base is periodically updated.

15. A computer system for generating and rating assessments, the computer system comprising:
one or more computer processors, one or more computer-readable storage media, and program instructions stored on one or more of the computer-readable storage media for execution by at least one of the one or more processors capable of performing a method, the method comprising:
gathering data relating to one or more specialized subject areas;
generating a knowledge base based on extracting one or more concepts from the data;
generating one or more questions and one or more corresponding answer keys relating to the one or more concepts, wherein data used to generate the one or more questions and the one or more corresponding answer keys is parsed from the generated knowledge base using a phase structure grammar parser, and wherein the one or more questions are formed using template matching; and
generating an assessment related to the one or more concepts based on the one or more questions and the one or more corresponding answer keys.

16. The computer system of claim 15, further comprising:
determining a complexity of the one or more questions;
associating the one or more questions with a concept expertise level based on the determined complexity;
and wherein generating an assessment related to the one or more concepts is further based on the concept expertise level associated with the one or more questions.

17. The computer system of claim 16, further comprising:
determining an expertise of a user; and
providing the generated assessment to the user based on the expertise of the user and the concept expertise level of the generated assessment.

18. The computer system of claim 17, further comprising:
receiving one or more answers to the one or more questions from the user; and
assessing the user based on comparing the one or more received answers to the one or more corresponding answer keys.

19. The computer system of claim 18, further comprising:
adjusting the assessment based on feedback.

20. The computer system of claim 19, wherein the feedback is generated via supervisory validation.

\* \* \* \* \*